No. 671,166.  
E. W. MITCHELL.  
HOSE COUPLING.  
(Application filed Jan. 8, 1901.)  
Patented Apr. 2, 1901.

(No Model.)

ATTEST.  
T. B. Moser  
W. A. Sheehan

INVENTOR.  
Edward W. Mitchell  
BY N. F. Fisher  
Atty.

THE NORRIS PETERS CO., PHOTO-LITHO., WASHINGTON, D. C.

UNITED STATES PATENT OFFICE.

EDWARD W. MITCHELL, OF OBERLIN, OHIO.

HOSE-COUPLING.

SPECIFICATION forming part of Letters Patent No. 671,166, dated April 2, 1901.

Application filed January 8, 1901. Serial No. 42,479. (No model.)

*To all whom it may concern:*

Be it known that I, EDWARD W. MITCHELL, a citizen of the United States, residing at Oberlin, in the county of Lorain and State of Ohio, have invented certain new and useful Improvements in Hose-Couplings; and I do declare that the following is a full, clear, and exact description of the invention, which will enable others skilled in the art to which it appertains to make and use the same.

My invention relates to hose-couplings; and the object of the invention is to provide a comparatively inexpensive and simple construction of coupling which can be connected and disconnected on the ground by hand without the use of a wrench or any other instrument and which is water-tight in itself and does not require packing of any kind to seal the joint.

To these several ends the invention consists in a telescopic coupling having the construction, combination, and arrangement of parts substantially as shown and described, and particularly pointed out in the claims.

Figure 1:
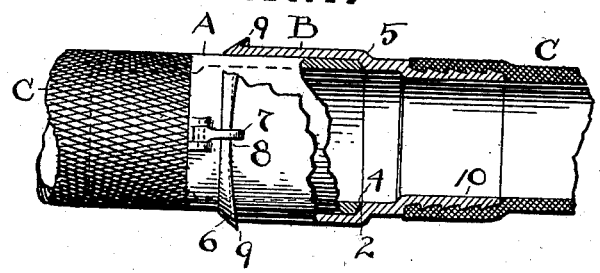
Figure 2:
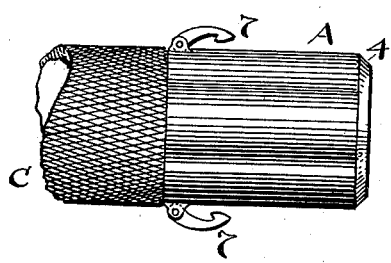
Figure 3:
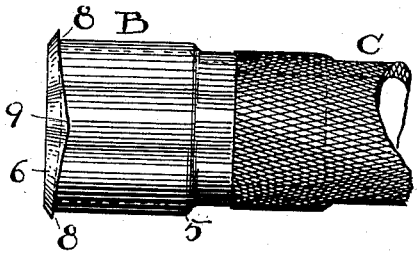
Figure 4:
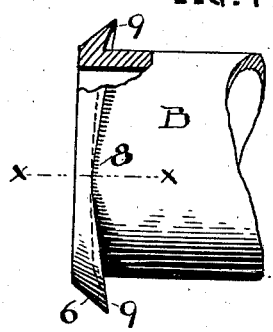
Figure 5:
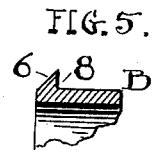
Figure 6:
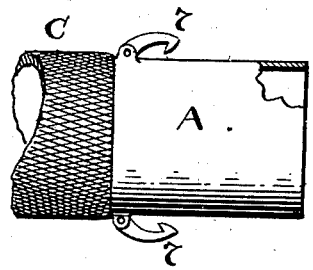

In the accompanying drawings, forming a part of this specification, Figure 1 is a plain elevation of my coupling complete and connected up as in use, a portion thereof being in section to show the relation of the parts in this form of the invention and showing also a section of hose secured to each member of the coupling. Fig. 2 is a plain elevation of the inner member of the coupling and a piece of hose thereon, and Fig. 3 is a plain elevation of the outer member and a piece of hose thereon. Fig. 4 is an elevation of the outer member, corresponding to the same part in Fig. 1, but sectioned at the top to show a cross-section of the flange at its highest point and its undercut feature particularly. Fig. 5 is a cross-section of a portion of the said outer member on line X X, Fig. 4, the point of hook engagement. Fig. 6 is a modification of the inner coupling, in which the beveled seating end is omitted.

The coupling thus shown consists, essentially, of two plain members or parts A and B, part A being the inner member and part B the outer member. Both these parts are tubular and of such sizes relatively that part A is adapted to fit so snugly into part B that a telescopic connection is made in which there is a perfectly close fit the full depth of tube A in tube or sleeve B.

Experience has demonstrated that with a coupling having the depth lengthwise relatively of the one herein shown and with a smooth-surfaced close-fitting union all around the full depth of said surfaces a practically tight water seal is obtained good for all ordinary purposes. However, to meet the demands for a coupling that is absolutely water-tight under high pressure, or, say, for fire-hose, I provide a beveled close-fitting seat 2 in member B for the correspondingly-beveled extremity 4 of member A, and in this instance member B is shouldered down at 5 or reduced all around, about as shown, to afford or provide seat 2 inside. If seating is not to be effected at this shoulder, member A may have a square cut-off, as in Fig. 6, in which case I rely wholly on the close fit of the parts to seal the joint, and said shoulder serves only as an abutting stop for said union member; but if the seating construction be used and in order that the said two members may be held together firmly at their seat, as well as to hold the parts together without the seat, I provide member B with a flange 6 about its outer end and member A with a hook or hooks to engage over or upon said flange. One hook will suffice for this purpose, because its only or chief office is to prevent their pulling apart except when the seat 2 4 is used. The said flange is constructed to promote tightness of the coupling when the hook or hooks are engaged therewith and either member A or B is rotated. To this end said flange is formed with a depression 8, called the "engaging portion," and elevations 9 for each hook. The said elevations are attained by a gradual and easy rise from the lowest point in the depression, and in this instance there are two, as there are also two depressions on opposite sides. At this point of engagement the flange is substantially square-shouldered, Fig. 5, and from this it runs into a gradually-deepening undercut to the top of rise 9. (Shown in Fig. 4.) Hook 7 is undercut also, and hence it can be engaged at 8 and be turned to the locking-point, which is toward rise 9, without losing anything of the closeness of the connection originally made and insuring the fixedness of the hook in the handling of the hose. If only one hook were used, there could still be two or more such engaging portions in flange 6 for greater convenience in coupling up. Then as connection is made by inserting member A into member B the full depth to shoulder 5 and hook 7 is engaged over flange 6 at its lowest point the rotation of either member and the holding of the other by hand will draw the parts tightly together and effect the union. For small couplings, such as lawn-hose, the grasping of one member by one hand and the other by the other hand enables one person to easily connect and disconnect the parts in a moment, and this enables one to break up long hose for convenience of handling; but for large and heavy hose, such as are used with fire-engines, the work is more easily and quickly done by two persons, one holding each member.

The foregoing construction makes a very effective connection in very brief time and by comparatively slight rotation of the parts, so that there is no undue twisting of the hose in uniting them. Of course it is presumed that the sealing-surfaces of the two members are ground if they be cast and used for fire-hose and the like; but for lawn purposes the smoothness of ordinary brass piping or tubing is sufficient, and flange 6 may be an integral or an affixed part of member B.

Any acceptable way of attaching hose C may be used, and I have here shown a corrugated shank 10, over which the hose are engaged.

By "inner ends" I mean those over which the hose C are engaged, and the opposite ends are the so-called "outer ends."

In any case, whether seat 2 4 be used or not, I purpose to make a practical water seal between the two members by fitting them snugly together. Having engaged the hook 7, it is immaterial which way it is turned, as the effect will be the same either way.

What I claim is—

1. In hose-couplings, a coupling member having a flange extending entirely around its outer end, said flange formed with one or more depressions and inwardly and rearwardly flaring edges rising from each depression to the highest points in said flange, substantially as described.

2. In hose-couplings, an inner member provided with a tubular body having a plain smooth outer surface and a hook near its inner end, in combination with an outer member constructed to sleeve closely over the inner member and make a water-tight union and provided with a flange about its outer end, said flange constructed with an engaging portion for said hook and the edge thereof flaring rearwardly at an inclination at both sides onto either of which said hook is adapted to be turned to tighten the coupling, substantially as described.

3. In hose-couplings, an outer coupling member having a smooth tubular interior and a flange about its outer end constructed with a substantially square-shouldered engaging portion, and the edge of the flange running from said engaging portion both ways flaring and deepening gradually and formed with gradually-deepening undercut surfaces, substantially as described.

Witness my hand to the foregoing specification this 21st day of December, 1900.

EDWARD W. MITCHELL.

Witnesses:
M. A. SHEEHAN,
R. B. MOSER.